(12) United States Patent
Reale et al.

(10) Patent No.: US 7,272,933 B2
(45) Date of Patent: Sep. 25, 2007

(54) METHODS AND APPARATUS FOR OPERATING GAS TURBINE ENGINES

(75) Inventors: Michael Joseph Reale, Milford, OH (US); Narendra Digamber Joshi, Cincinnati, OH (US); David Paul Wolf, West Chester, OH (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 10/766,437

(22) Filed: Jan. 28, 2004

(65) Prior Publication Data

US 2005/0160736 A1    Jul. 28, 2005

(51) Int. Cl.
*F02C 3/30* (2006.01)
*F02C 7/143* (2006.01)

(52) U.S. Cl. ............................ 60/775; 60/39.53; 60/728

(58) Field of Classification Search ............... 60/39.53, 60/775, 728
See application file for complete search history.

(56) References Cited

U.S. PATENT DOCUMENTS

| | | | | |
|---|---|---|---|---|
| 2,372,846 | A | * | 4/1945 | Nettel et al. ............... 202/152 |
| 4,522,024 | A | * | 6/1985 | Zaugg ........................ 60/775 |
| 5,282,726 | A | | 2/1994 | Warren |
| 5,491,971 | A | | 2/1996 | Tomlinson et al. |
| 5,669,217 | A | * | 9/1997 | Anderson .................... 60/775 |
| 5,758,606 | A | | 6/1998 | Rosen et al. |
| 6,196,165 | B1 | | 3/2001 | Rosen et al. |
| 6,347,605 | B1 | | 2/2002 | Wettergard |
| 6,397,578 | B2 | * | 6/2002 | Tsukamoto et al. .......... 60/728 |
| 6,405,686 | B1 | | 6/2002 | Wettergard |
| 6,412,291 | B1 | * | 7/2002 | Erickson ....................... 62/87 |
| 6,467,252 | B1 | * | 10/2002 | Payling et al. ............ 60/39.53 |
| 6,578,362 | B1 | | 6/2003 | Coffinberry |
| 6,584,778 | B1 | | 7/2003 | Griffiths et al. |
| 2005/0252231 | A1 | | 11/2005 | Haertel et al. |

FOREIGN PATENT DOCUMENTS

| | | |
|---|---|---|
| EP | 0524435 A2 | 1/1993 |
| EP | 0770771 A1 | 5/1997 |
| WO | 03102424 A1 | 12/2003 |

OTHER PUBLICATIONS

Search Report; European Patent Office; Reference 140069/10517; Application No. 05250184.8-2315; Applicant General Electric Company; Munich; Aug. 8, 2006; 4 pgs.

* cited by examiner

*Primary Examiner*—Ted Kim
(74) *Attorney, Agent, or Firm*—William Scott Andes; Armstrong Teasdale LLP

(57) ABSTRACT

A method for operating a gas turbine engine, including a first compressor, a second compressor, and a turbine, coupled together in serial flow arrangement. The method includes channeling compressed airflow discharged from the first compressor through an intercooler having a cooling medium flowing therethrough, operating the intercooler such that condensate is formed in the intercooler from the compressed airflow, and channeling the condensate to an inlet of the first or second compressor to facilitate reducing an operating temperature of the gas turbine engine.

20 Claims, 3 Drawing Sheets

METHODS AND APPARATUS FOR OPERATING GAS TURBINE ENGINES

BACKGROUND OF THE INVENTION

This invention relates generally to gas turbine engines, and more specifically to methods and apparatus for operating gas turbine engines.

Gas turbine engines generally include, in serial flow arrangement, a high-pressure compressor for compressing air flowing through the engine, a combustor in which fuel is mixed with the compressed air and ignited to form a high temperature gas stream, and a high pressure turbine. The high-pressure compressor, combustor and high-pressure turbine are sometimes collectively referred to as the core engine. Such gas turbine engines also may include a low-pressure compressor, or booster, for supplying compressed air to the high pressure compressor.

Gas turbine engines are used in many applications, including in aircraft, power generation, and marine applications. The desired engine operating characteristics vary, of course, from application to application. More particularly, when the engine is operated in an environment in which the ambient temperature is reduced in comparison to other environments, the engine may be capable of operating with a higher shaft horse power (SHP) and an increased output, without increasing the core engine temperature to unacceptably high levels. However, if the ambient temperature is increased, the core engine temperature may rise to an unacceptably high level if a high SHP output is being delivered.

To facilitate meeting operating demands, even when the engine ambient temperature is high, e.g., on hot days, at least some known gas turbine engines include an intercooler heat exchanger positioned between the booster compressor and the high pressure compressor to facilitate reducing the temperature of the air entering the high pressure compressor. Using an intercooler facilitates increasing the efficiency of the engine while reducing the quantity of work performed by the high pressure compressor. However, when the intercooler is operated during relatively hot day and/or humid operating conditions, water condenses out of the intercooler airstream into the bottom of the intercooler. Consequently, the water is removed from the engine cooling cycle which may result in both an output power and an efficiency of the gas turbine engine being reduced.

BRIEF DESCRIPTION OF THE INVENTION

In one aspect, a method for operating a gas turbine engine, including a first compressor, a second compressor, a combustor and a turbine, coupled together in serial flow arrangement is provided. The method includes channeling compressed airflow discharged from the first compressor through an intercooler having a cooling medium flowing therethrough, operating the intercooler such that condensate is formed in the intercooler from the compressed airflow, and channeling the condensate to an inlet of the second compressor to facilitate reducing an operating temperature of the gas turbine engine.

In another aspect, a cooling system for a gas turbine engine that includes at least a first compressor, a second compressor, and a turbine is provided. The cooling system includes an intercooler coupled downstream from the first compressor such that compressed air discharged from the first compressor is routed therethrough, the intercooler having a working fluid flowing therethrough, and an injection system coupled in flow communication with the intercooler, the injection system configured to channel condensate formed in the intercooler into the second compressor to facilitate reducing an operating temperature of the gas turbine engine.

In a further aspect, a gas turbine engine is provided. The gas turbine engine includes a first compressor, a second compressor downstream from the first compressor, a turbine coupled in flow communication with the second compressor, and a cooling system. The cooling system includes an intercooler coupled downstream from the first compressor such that compressed air discharged from the first compressor is routed therethrough, the intercooler having a working fluid flowing therethrough, and an injection system coupled in flow communication with the intercooler, the injection system is configured to channel condensate formed in the intercooler into the second compressor to facilitate reducing an operating temperature of the gas turbine engine.

DETAILED DESCRIPTION OF THE INVENTION

Figure 1:
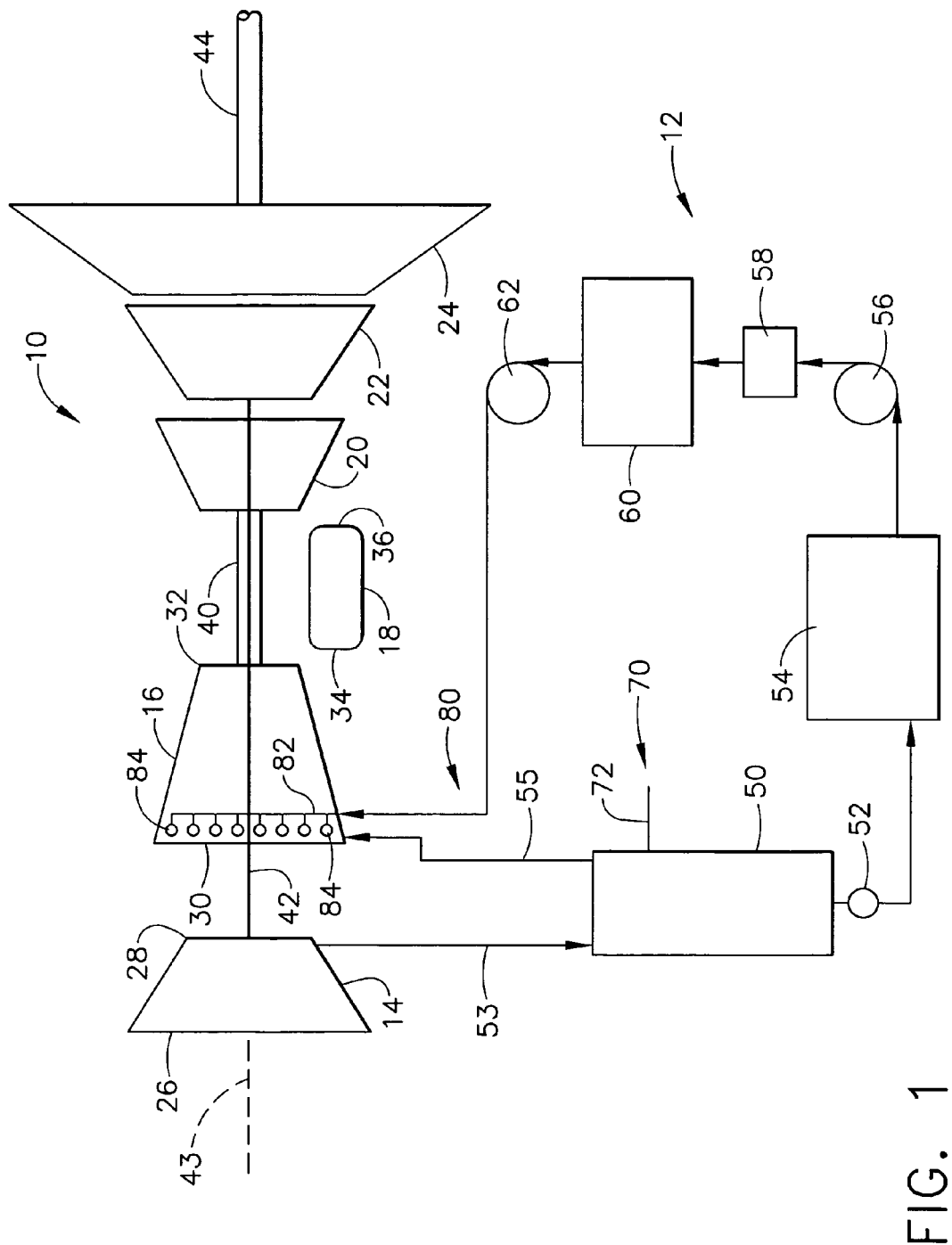
FIG. 1 is a block diagram of an exemplary gas turbine engine including a cooling system.

FIG. 1 is a block diagram of a gas turbine engine 10 including a cooling system 12. In the exemplary embodiment, gas turbine engine 10 is a dry-low emission (DLE) gas turbine engine. With the exception of gas path air cooling system 12, described in more detail below, engine 10 is known in the art and includes, in serial flow relationship, a low pressure compressor or booster 14, a high pressure compressor 16, a combustor 18, a high pressure turbine 20, a low pressure, or intermediate turbine 22, and a power turbine or free turbine 24. Low pressure compressor or booster 14 has an inlet 26 and an outlet 28, and high pressure compressor 16 includes an inlet 30 and an outlet 32. Combustor 18 has an inlet 34 that is substantially coincident with high pressure compressor outlet 32, and an outlet 36.

High pressure turbine 20 is coupled to high pressure compressor 16 with a first rotor shaft 40, and low pressure turbine 22 is coupled to low pressure compressor 14 with a second rotor shaft 42. Rotor shafts 40 and 42 are each substantially coaxially aligned with respect to a longitudinal centerline axis 43 of engine 10. Engine 10 may be used to drive a load (not shown) which may be coupled to a power turbine shaft 44. Alternatively, the load may be coupled to a forward extension (not shown) of rotor shaft 42.

In operation, ambient air, drawn into low pressure compressor inlet 26, is compressed and channeled downstream to high pressure compressor 16. High pressure compressor 16 further compresses the air and delivers high pressure air to combustor 18 where it is mixed with fuel, and the mixture is ignited to generate high temperature combustion gases. The combustion gases are channeled from combustor 18 to drive turbines 20, 22, and 24.

The power output of engine 10 is at least partially related to operating temperatures of the gas flow at various locations along the gas flow path. More specifically, in the exemplary embodiment, an operating temperature of the gas flow at high-pressure compressor outlet 32, and an operating temperature of the gas flow at combustor outlet 36 are closely monitored during the operation of engine 10. Reducing an operating temperature of the gas flow entering high pressure compressor 16 facilitates increasing the power output of engine 10.

To facilitate reducing the operating temperature of a gas flow entering high pressure compressor 16, cooling system 12 includes an intercooler 50, including a drain 52, coupled in flow communication to low pressure compressor 14. Airflow 53 from low pressure compressor 14 is channeled to intercooler 50 for additional cooling prior to the cooled air 55 being returned to high-pressure compressor 16.

Cooling system 12 also includes a condensate holding tank 54 coupled in flow communication to intercooler 50 through drain valve 52, a pump 56 coupled in flow communication to condensate holding tank 54, a demineralizer 58 coupled in flow communication to pump 56, a demineralizer condensate tank 60 coupled in flow communication to demineralizer 58, and a pump 62 coupled in flow communication to demineralizer condensate tank 60.

Intercooler 50 has a working fluid 70 flowing therethrough for removing energy extracted from the gas flow path. In one embodiment, working fluid 70 is air, and intercooler 50 is an air-to-air heat exchanger. In another embodiment, working fluid 70 is water, and intercooler 50 is a air-to-water heat exchanger. Intercooler 50 extracts heat energy from the compressed air flow path 53 and channels cooled compressed air 55 to high pressure compressor 16. More specifically, in the exemplary embodiment, intercooler 50 includes a plurality of tubes (not shown) through which compressed air 53, i.e. airflow from low pressure compressor 14, circulates. Heat is transferred from compressed air 53 through a plurality of tube walls (not shown) to working fluid 70 supplied to intercooler 50 through an inlet 72. When engine 10 is operated on a hot or humid day, water is condensed out of hot compressed air 53 and is stored at a bottom portion of intercooler 50.

Cooling system 12 also includes a condensate injection system 80 coupled in flow communication with pump 62. Condensate injection system 80 includes a piping manifold 82 and a plurality of injectors 84 coupled to piping manifold 82. Piping manifold 82 is attached to gas turbine engine 10 and receives condensate from pump 62. In the exemplary embodiment, piping manifold 82 is annular and extends circumferentially around high pressure compressor 16 to facilitate supplying a substantially consistent flow of condensate between pump 62 and injectors 84. Spray injectors 84 extend radially inward towards gas turbine centerline axis 43 and are configured to discharge condensate from spray injectors 84 in a fine mist towards high pressure compressor 16. In one embodiment, condensate droplets exit injectors 84 with a mean diameter size of approximately twenty microns.

Figure 2:
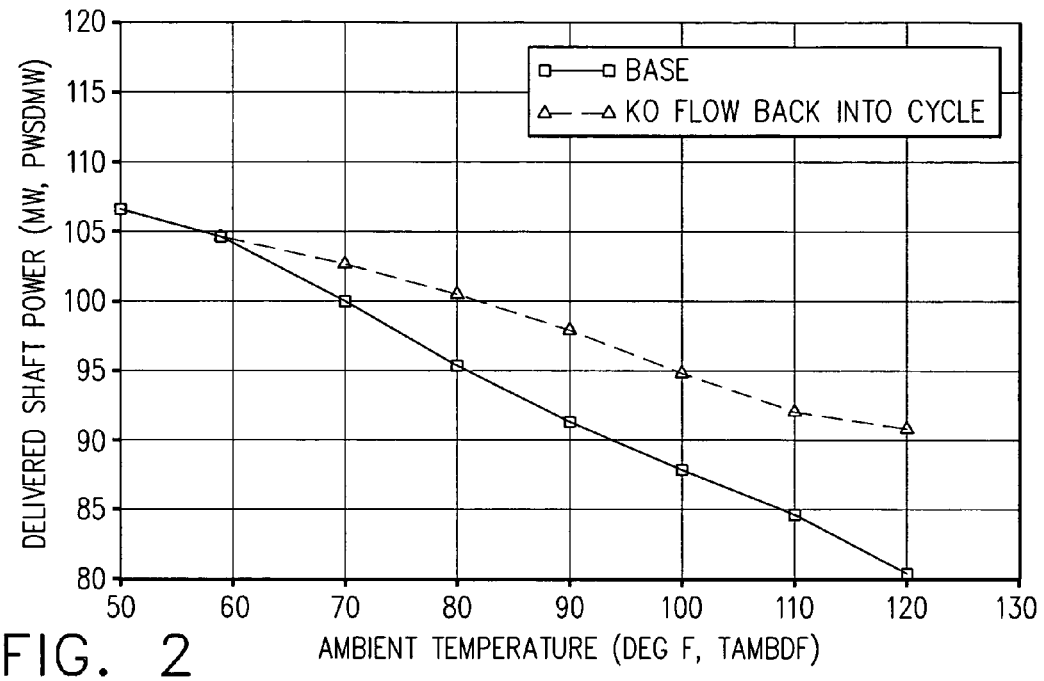
FIG. 2 is an exemplary graphical illustration of an engine shaft power generated using the cooling system shown in FIG. 1.
Figure 3:
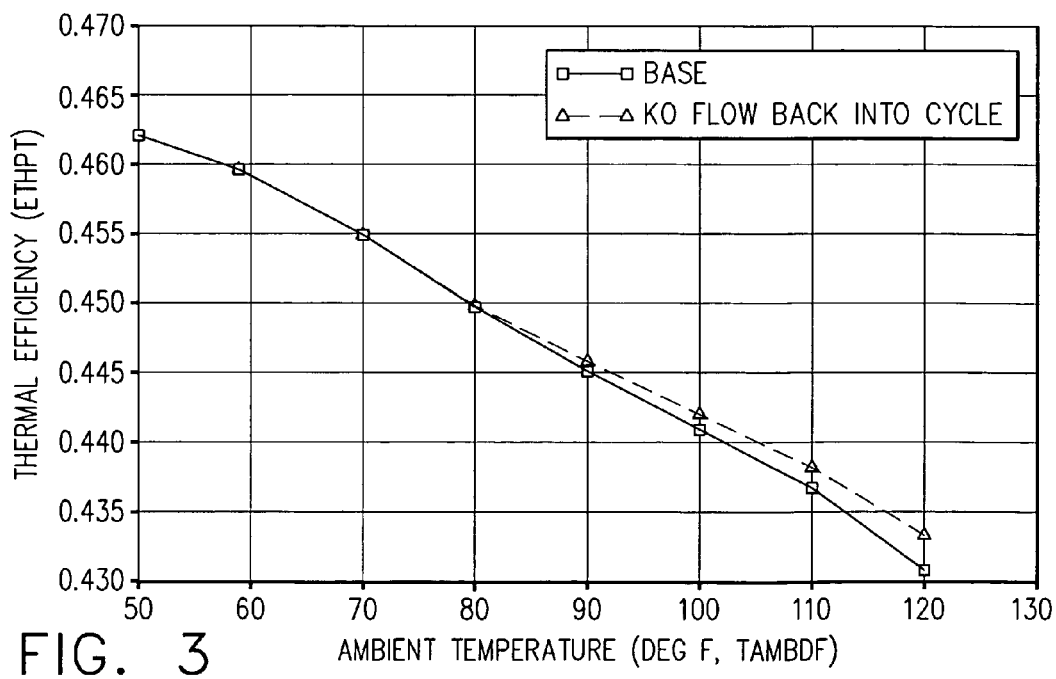
FIG. 3 is an exemplary graphical illustration of an engine thermal efficiency generated using the cooling system shown in FIG. 1.

During operation, working fluid 70 is channeled to intercooler 50 at a temperature that enables condensate to form in the air-side of intercooler 50. The condensate is then channeled from intercooler 50 and through drain valve 52 to holding tank 54. Pump 56 then channels the condensate from holding tank 54, through demineralizer 58, and into demineralizer condensate tank 60. In the exemplary embodiment, demineralizer 58 is at least one of a reverse osmosis apparatus and a ion-exchange apparatus that is configured to facilitate removing trace elements from the condensation. Pump 62 then channels the demineralized condensate through injection system 80 at a predetermined rate and a temperature known in the art as a KO flow back into cycle temperature, as shown in FIGS. 2 and 3. The condensate exiting injection system 80 is atomized by injectors 84 and is discharged into low pressure compressor 14 as a fine mist. The mist facilitates reducing an operating temperature of the airflow within gas turbine engine 10, thus creating an intercooling effect that enables the air exiting high pressure compressor 16 to have an increased work capacity. Because a temperature of air 55 entering high pressure compressor 16 is reduced, less work is required for high pressure compressor 16.

FIG. 2 is an exemplary graphical illustration of engine 10 shaft power generated using cooling system 12. FIG. 3 is an exemplary graphical illustration of engine 10 thermal efficiency generated using cooling system 12. In the exemplary embodiment, and referring to FIG. 2, when the ambient air temperature is less than approximately 60° Fahrenheit (F.), condensate is not formed in intercooler 50, and thus cooling system 12 is not activated. However, when the ambient temperature increases above approximately 60° F. and a desired humidity level is reached, cooling system 12 may be activated, resulting in an increased power output. For example, and more specifically, when the ambient temperature is approximately 100° F., cooling system 12 facilitates increasing the power output approximately seven megawatt (MW), i.e. approximately 8%. Moreover, and referring to FIG. 3, operating cooling system 12 results in a thermal efficiency increase when the ambient temperature is approximately 100° F.

Figure 4:
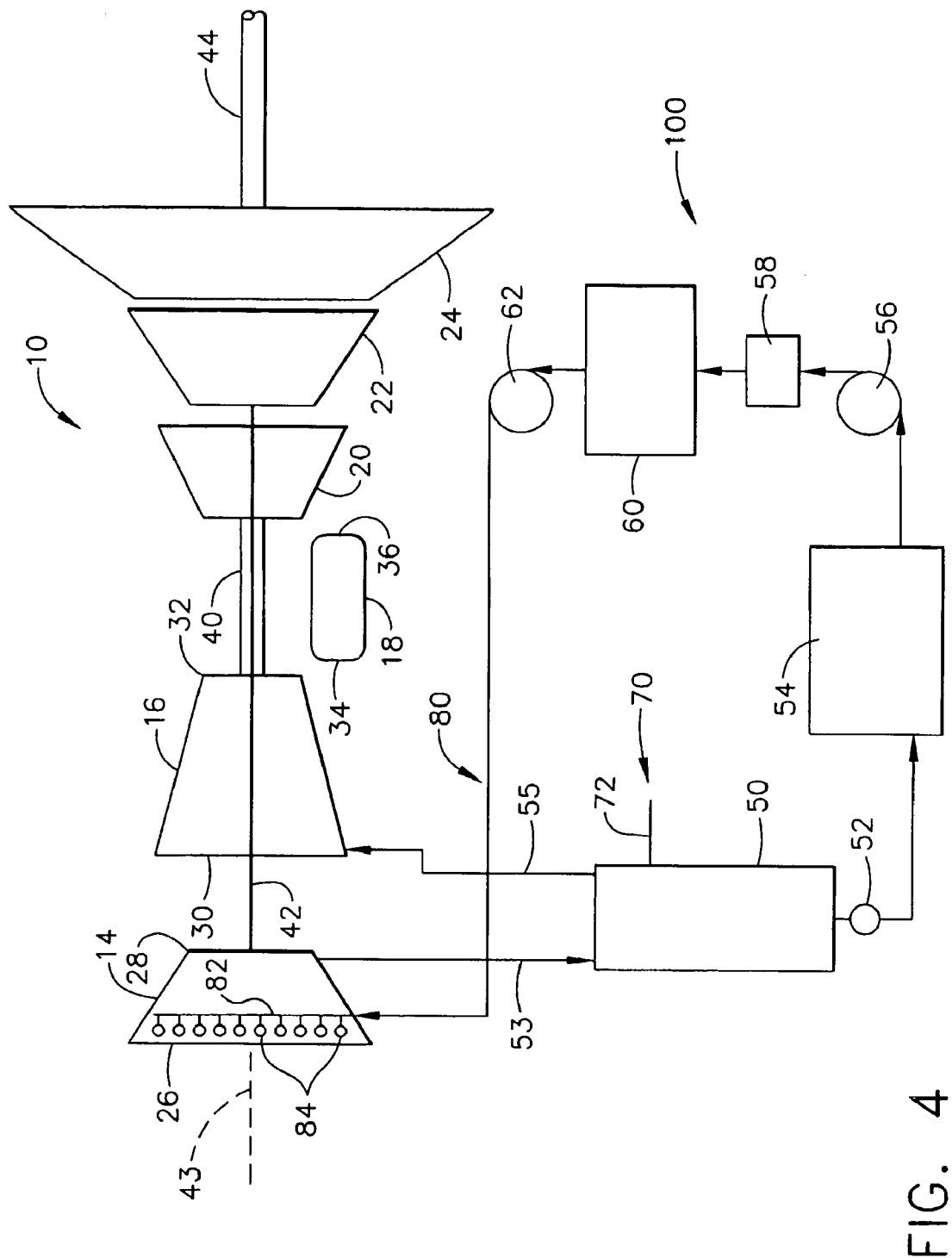
FIG. 4 is a block diagram of an exemplary gas turbine engine including a cooling system.

FIG. 4 is a block diagram of a gas turbine engine 10 which includes a cooling system 100. Cooling system 100 is substantially similar to cooling system 12, (shown in FIG. 1) and components of cooling system 12 that are identical to components of cooling system 100 are identified in FIG. 4 using the same reference numerals used in FIG. 1.

Cooling system 100 includes a condensate injection system 80 coupled in flow communication with pump 62. Condensate injection system 80 includes a piping manifold 82 and a plurality of injectors 84 coupled to piping manifold 82. Piping manifold 82 is attach to gas turbine 10 and receives condensate from pump 62. In the exemplary embodiment, piping manifold 82 is annular and extends circumferentially around low pressure compressor 14 to facilitate supplying a substantially consistent flow of condensate between pump 62 and injectors 84. Spray injectors 84 extend radially inward towards gas turbine centerline axis 43 and are configured to discharge condensate from spray injectors 84 in a fine mist towards low pressure compressor 14. In one embodiment, condensate droplets exit injectors 84 with a mean diameter size of approximately twenty microns.

During operation, working fluid 70 is channeled to intercooler 50 at a temperature that enables condensate to form in the air-side of intercooler 50. The condensate is then channeled from intercooler 50 and through drain valve 52 to holding tank 54. Pump 56 then channels the condensate from holding tank 54, through demineralizer 58, and into demineralizer condensate tank 60. In the exemplary embodiment, demineralizer 58 is at least one of a reverse osmosis apparatus and a ion-exchange apparatus that is configured to facilitate removing trace elements from the condensation. Pump 62 then channels the demineralized condensate through injection system 80 at a predetermined rate. The condensate exiting injection system 80 is atomized by injectors 84 and is discharged into high pressure compressor 16 as a fine mist. The mist facilitates reducing an operating temperature of the airflow within gas turbine engine 10, thus creating an intercooling effect that enables the air exiting high pressure compressor 16 to have an increased work capacity.

In use, cooling systems 12 and 100 facilitate reducing compression work required in high pressure compressor 16. Additionally, injecting condensate into either low pressure compressor 14 or high pressure compressor 16 facilitates increasing a mass flow in gas turbine engine 10 allowing gas turbine engine 10 to operate more efficiently while still producing an increased quantity of power compared to engines not utilizing cooling systems 12 or 100. Additionally, it should be realized that cooling systems 12 and 100 can also be utilized with a single annular combustion engine. Accordingly, cooling systems 12 and 100 thus facilitate improving both power output from turbine engine 10 and an increase in operating efficiency of engine 10 while utilizing condensate to cool either the low pressure compressor air or the high pressure compressor air.

The above-described cooling systems provide a cost-effective and highly reliable method for gas flow cooling in a gas turbine engine. The cooling systems use a minimal quantity of condensate to cool the high pressure compressor inlet air to facilitate increasing the potential power output of the engine. Accordingly, a gas path cooling system is provided that facilitates reducing gas path temperatures thereby improving engine efficiency in a cost-effective manner.

Exemplary embodiments of gas path cooling systems are described above in detail. The gas path cooling systems are not limited to the specific embodiments described herein, but rather, components of the system may be utilized independently and separately from other components described herein. Each gas path cooling component can also be used in combination with other gas path cooling components.

While the invention has been described in terms of various specific embodiments, those skilled in the art will recognize that the invention can be practiced with modification within the spirit and scope of the claims.

What is claimed is:

1. A method for operating a gas turbine engine, including a first compressor, a second compressor, and a turbine, coupled together in serial flow arrangement, said method comprising:
   channeling compressed airflow discharged from the first compressor through an intercooler having a cooling medium flowing therethrough;
   operating the intercooler such that the compressed airflow is facilitated to be cooled and condensate is formed in the intercooler from the compressed airflow;
   channeling the cooled compressed airflow and the condensate from the intercooler to an inlet of the second compressor to facilitate reducing an operating temperature of the gas turbine engine, wherein channeling the condensate comprises:
   channeling the condensate from the intercooler to an annular manifold using an injection system coupled in flow communication between the intercooler and the manifold, wherein the injection system facilitates supplying the condensate to a plurality of nozzles coupled to the manifold; and
   ejecting the condensate from the plurality of nozzles to an inlet of the second compressor.

2. A method in accordance with claim 1 wherein said intercooler comprises a drain valve, said method further comprises channeling the condensate through the drain valve to a first storage tank.

3. A method in accordance with claim 2 further comprising channeling the condensate from the storage tank, through a first pump, to a demineralizer.

4. A method in accordance with claim 3 further comprising channeling the condensate from the demineralizer to a demineralizer holding tank.

5. A method in accordance with claim 4 further comprising channeling the condensate from the demineralizer holding tank to the second compressor using a second pump that is different than the first pump.

6. A method in accordance with claim 1 wherein channeling the condensate to an inlet of the second compressor further comprises channeling condensate through an injection assembly coupled to the inlet of the second compressor.

7. A method in accordance with claim 1 wherein channeling the condensate to an inlet of the second compressor further comprises channeling condensate to the inlet of the second compressor at a predetermined rate.

8. A method in accordance with claim 1 wherein channeling condensate to an inlet of the second compressor comprises channeling condensate through an injection system including a plurality of circumferentially spaced injectors, to the inlet of the second compressor at a predetermined rate.

9. A cooling system for a gas turbine engine that includes at least a first compressor, a second compressor, and a turbine, said cooling system comprising:
   an intercooler coupled downstream from the first compressor such that compressed air discharged from the first compressor is routed therethrough, said intercooler having a working fluid flowing therethrough to facilitate cooling the compressed air to form condensate, said intercooler configured to discharge the cooled compressed air and the condensate to the second compressor;
   an injection system coupled in flow communication between said intercooler and the second compressor; and
   an annular manifold extending circumferentially around the second compressor and comprising a plurality of nozzles, said injection system configured to channel the condensate discharged from said intercooler into said annular manifold to facilitate supplying a flow of condensate to said plurality of nozzles, said plurality of nozzles configured to eject condensate into the second compressor, such that the condensate and the cooled compressed air facilitate reducing an operating temperature of the gas turbine engine.

10. A cooling system in accordance with claim 9 further comprising a condensate holding tank in flow communication with said intercooler, said condensate holding tank configured to receive said condensate formed in said intercooler.

11. A cooling system in accordance with claim 10 further comprising a first pump coupled in flow communication with said condensate holding tank.

12. A cooling system in accordance with claim 11 further comprising a demineralizer, said first pump directs said condensate through said demineralizer to a demineralizer holding tank.

13. A cooling system in accordance with claim 12 further comprising a second pump, different than said first pump, in flow communication with said demineralizer holding tank, said second pump configured to channel condensate from said demineralizer holding tank to said condensate injection system.

14. A cooling system in accordance with claim 9 wherein said condensate injection system comprises a plurality of injectors positioned circumferentially around an outer periphery of said second compressor.

15. A cooling system in accordance with claim 9 wherein said injection system is configured to channel condensate formed in said intercooler into said second compressor at a predetermined rate.

16. A gas turbine engine comprising:
a first compressor;
a second compressor downstream from said first compressor;
a turbine coupled in flow communication with said second compressor; and
a cooling system comprising:
an intercooler coupled downstream from said first compressor such that compressed air discharged from said first compressor is routed therethrough, said intercooler having a working fluid flowing therethrough to facilitate cooling the compressed air to form condensate, said intercooler configured to discharge the cooled compressed air and the condensate to said second compressor;
a condensate injection system coupled in flow communication between said intercooler and said second compressor; and
an annular manifold coupled in flow communication to said second compressor and comprising a plurality of nozzles, said condensate injection system configured to channel the condensate discharged from said intercooler into said plurality of nozzles for ejection into said second compressor, such that the condensate and the cooled compressed air facilitate reducing a temperature of said gas turbine engine.

17. A gas turbine engine in accordance with claim 16 wherein said cooling system further comprises a condensate holding tank in flow communication with said intercooler, said condensate holding tank configured to receive said condensate formed in said intercooler.

18. A gas turbine engine in accordance with claim 16 wherein said cooling system further comprises:
a first pump coupled in flow communication with said condensate holding tank;
a demineralizer in flow communication with said first pump; and
a demineralizer holding tank in flow communication with said demineralizer, said first pump directs said condensate through said demineralizer to said demineralizer holding tank.

19. A gas turbine engine in accordance with claim 16 wherein said injection system further comprises a plurality of injectors positioned circumferentially around an outer periphery of said second compressor.

20. A gas turbine engine in accordance with claim 16 wherein said injection system further comprises a plurality of injectors configured to channel a condensate formed in said intercooler into said second compressor at a predetermined rate.

* * * * *